United States Patent
Karlsson

(10) Patent No.: US 9,975,423 B2
(45) Date of Patent: May 22, 2018

(54) ANTI-THEFT DEVICE FOR A FUEL TANK

(71) Applicant: RETINENDI AB, Sjuntorp (SE)

(72) Inventor: Dick Karlsson, Sjuntorp (SE)

(73) Assignee: RETINENDI AB, Sjuntorp (SE)

( * ) Notice: Subject to any disclaimer, the term of this patent is extended or adjusted under 35 U.S.C. 154(b) by 275 days.

(21) Appl. No.: 14/760,224

(22) PCT Filed: Jan. 27, 2014

(86) PCT No.: PCT/SE2014/050099
§ 371 (c)(1),
(2) Date: Jul. 10, 2015

(87) PCT Pub. No.: WO2014/116178
PCT Pub. Date: Jul. 31, 2014

(65) Prior Publication Data
US 2015/0352946 A1 Dec. 10, 2015

(30) Foreign Application Priority Data

Jan. 27, 2014 (SE) .................................... 1350086

(51) Int. Cl.
*B60K 15/04* (2006.01)
*B60K 15/03* (2006.01)

(52) U.S. Cl.
CPC ...... *B60K 15/0403* (2013.01); *B60K 15/0409* (2013.01); *B60K 2015/03375* (2013.01);
(Continued)

(58) Field of Classification Search
CPC ...... B60K 15/0403; B60K 2015/03434; B60K 15/04; B67D 7/32
(Continued)

(56) References Cited

U.S. PATENT DOCUMENTS 1,766,916 A * 6/1930 MacLiver .......... B60K 15/0403
220/86.3
2,066,830 A * 1/1937 Fenton ............... B60K 15/0406
220/86.3

(Continued)

FOREIGN PATENT DOCUMENTS

BE 1016911 A5 9/2007
EP 1325830 A1 7/2003
(Continued)

OTHER PUBLICATIONS

International Search Report dated May 5, 2014, for International Patent Application No. PCT/SE2014/050099.

*Primary Examiner* — Anthony Stashick
*Assistant Examiner* — Blaine Neway
(74) *Attorney, Agent, or Firm* — Karceski IP Law, PLLC

(57) ABSTRACT

The present invention relates to an anti-theft device for fuel tanks, wherein the anti-theft device comprises a pipe to be secured to a fuel inlet, wherein the pipe comprises attachment means at its upper portion, furthermore the pipe comprises at least one opening disposed in the side wall of the pipe, wherein the pipe is closed at a lower portion and that said pipe accommodates a substance, wherein said substance is adapted, in the event of a fuel theft attempt, to be carried with the fuel into the pump used during the theft attempt and thereby prevent continued pumping with it, and that the substance is further adapted to be incapable of leaking into the actual fuel tank.

11 Claims, 2 Drawing Sheets

(52) U.S. Cl.
CPC ............... *B60K 2015/03434* (2013.01); *B60K 2015/0451* (2013.01); *B60K 2015/0464* (2013.01); *B60K 2015/0477* (2013.01)

(58) Field of Classification Search
USPC ................................................ 220/562, 86.3
See application file for complete search history.

(56) References Cited

U.S. PATENT DOCUMENTS

| | | | | |
|---|---|---|---|---|
| 2,379,735 | A * | 7/1945 | Meikle ............... | B60K 15/0406 210/172.6 |
| 5,183,170 | A * | 2/1993 | Stege .................... | B60K 15/04 220/86.2 |
| 8,746,479 | B2 * | 6/2014 | Keefer .................. | B60K 15/04 137/527.2 |
| 2005/0051236 | A1 | 3/2005 | Watson | |

FOREIGN PATENT DOCUMENTS

| | | |
|---|---|---|
| GB | 2424870 A | 10/2006 |
| GB | 2476954 A | 7/2011 |

* cited by examiner

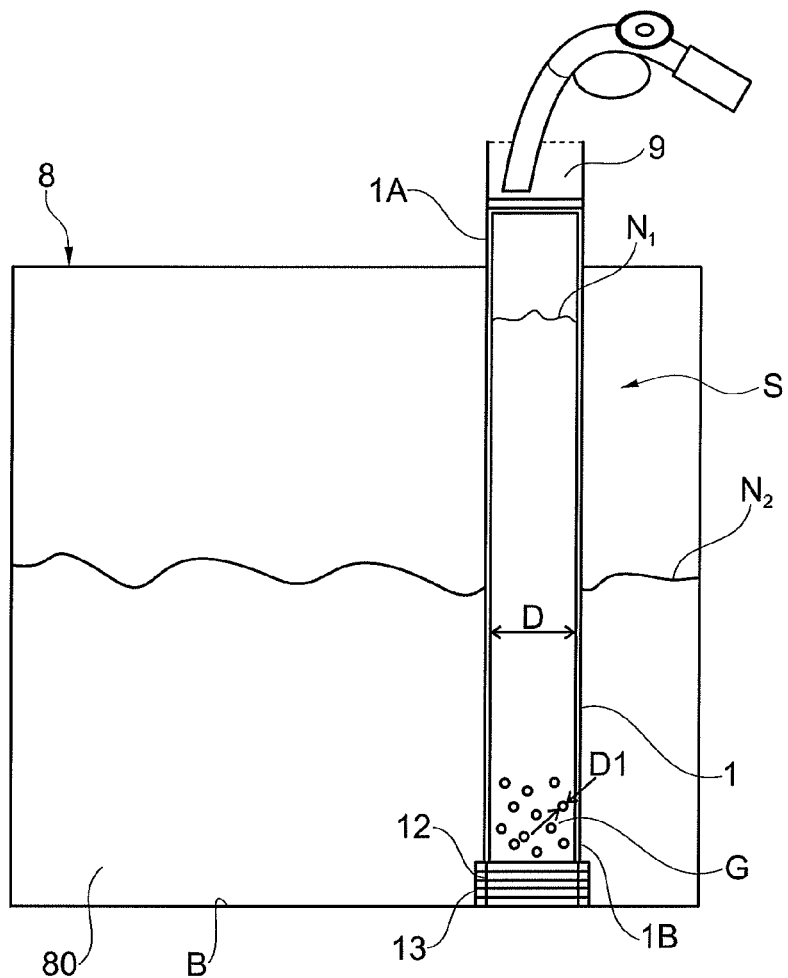
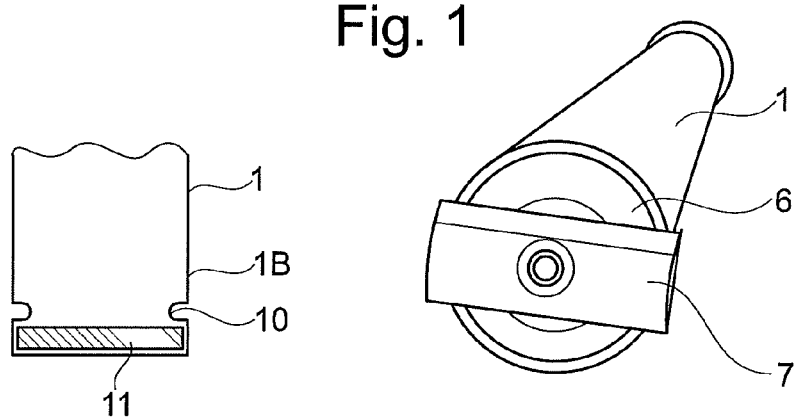
Fig. 1
Fig. 4
Fig. 2

ANTI-THEFT DEVICE FOR A FUEL TANK

CROSS-REFERENCE TO RELATED APPLICATION(S)

This is a National Stage Entry into the United States Patent and Trademark Office from International PCT Patent Application No. PCT/SE2014/050099, having an international filing date of Jan. 27, 2014, which claims priority to Sweden Patent Application No. SE 1350086-3, filed Jan. 28, 2013, the entire contents of both of which are incorporated herein by reference.

TECHNICAL FIELD

The present invention relates to an anti-theft device for fuel tanks, wherein the anti-theft device comprises a pipe to be secured to a fuel inlet, wherein the pipe comprises attachment means at its upper portion, furthermore the pipe comprises at least one opening disposed in the side wall of the pipe.

STATE OF THE ART

It is known since a long time that thefts of liquid fuel occur in all kinds of fuel tanks. The tank cap is forced open and a hose or the like is inserted into the tank and the fuel is pumped out. There are a number of different known anti-theft devices for fuel tanks.

A device to be placed in the fuel filler mouth to prevent siphoning of fuel is previously known from EP 1782993. The device comprises a perforated sleeve for accommodating a standard nozzle of a filling pump. The sleeve has two perforated plates at the lower bottom, wherein the perforation of the plates is non-overlapping, so that fuel can be refilled, but a siphoning tube cannot be introduced through the apertures into the tank.

An adaptor that is placed in the filler mouth of a fuel tank is previously known from WO 2009116862. A fuel theft protector can be incorporated into the adaptor. The protector comprises a perforated pipe, wherein an element having a conical top, allowing the fuel to flow without splattering back when refilling, is disposed at the bottom of the pipe. The protector does not allow a hose to be inserted very far during a fuel theft and thereby prevents larger amounts of fuel from being stolen.

An antitheft device for fuel tanks is previously known from EP 0901926, wherein the device is welded inside the fuel filler hole. The device comprises a perforated collar having a conically projecting part at the bottom of the collar. Fuel can be filled into the tank through the holes in the collar, and the conical part allows a good filling flow, whereas the small holes in the collar do not allow a hose to pass during a fuel theft.

Considering the fact that, in spite of the above-mentioned fuel protectors, there are still far too many fuel thefts, there is a need for an improved anti-theft device for all kinds of fuel tanks.

BRIEF DESCRIPTION OF THE INVENTION

It is an object of the present invention to eliminate or at least minimize the above-mentioned problem, which is achieved by an anti-theft device according to claim 1.

Thanks to the invention, an anti-theft device is provided which rapidly and efficiently ruins the pump of the fuel thieves and prevents theft of the fuel.

According to one aspect of the invention, the anti-theft device comprises a substance which in the event of fuel theft is carried with the fuel into the pump and efficiently ruins the pump and prevents theft of fuel, at the same time as the granulate has no chance of leaking into the actual fuel tank.

According to another aspect of the invention, the anti-theft device comprises attachment means, which provide a quick and easy attachment of the anti-theft device to a fuel inlet, preferably in that a locking means in the fuel inlet is adapted to engage the attachment means of the anti-theft device.

According to yet another aspect of the invention, the pipe extends all the way to the bottom of the tank, which provides the advantage that it is not possible to hammer the pipe into the tank or to drill holes in the bottom of the pipe to get access to the fuel in the tank in that way.

According to a further aspect of the invention, the pipe comprises securing means in the form of resilient tongues, which provides the advantage that the mounting is done easily and smoothly, and that the tongues efficiently makes it impossible to pull the pipe back up and out of the fuel inlet after mounting.

According to yet another aspect, the pipe comprises a loose plate at its bottom, which makes it impossible to drill through the bottom of the pipe, since the plate would just rotate around in the event of a drilling attempt.

According to another aspect, the attachment means comprises engagement means, which are adapted to match the locking means of the fuel cap in the fuel inlet, which makes it easy to attach the pipe to the fuel inlet.

According to yet another aspect of the invention, a stabilizing means/attachment means is disposed at the bottom end of the pipe to, on the one hand, prevent chafing between pipe and tank bottom, and, on the other hand, also to keep the pipe in position so that it does not sway back and forth.

According to a further aspect of the invention, the pipe has threads at its lower portion adapted to cooperate with threads at the bottom of the fuel tank, which provides a steady positioning of the pipe.

According to a further aspect of the invention, the pipe is a telescopic pipe, which means that the same pipe can be used in tanks of different sizes.

BRIEF DESCRIPTION OF THE FIGURES

In the following, the invention will be described in greater detail with reference to the attached figures of the drawings, in which:

FIG. 1 shows a fuel tank with an anti-theft device according to the invention, seen in cross-section;

FIG. 2 shows a stabilizing means/attachment means according to the invention, seen from below;

FIG. 4 shows a cross-section of a lower portion of an anti-theft device according to the invention.

DETAILED DESCRIPTION OF THE FIGURES

Figure 3:
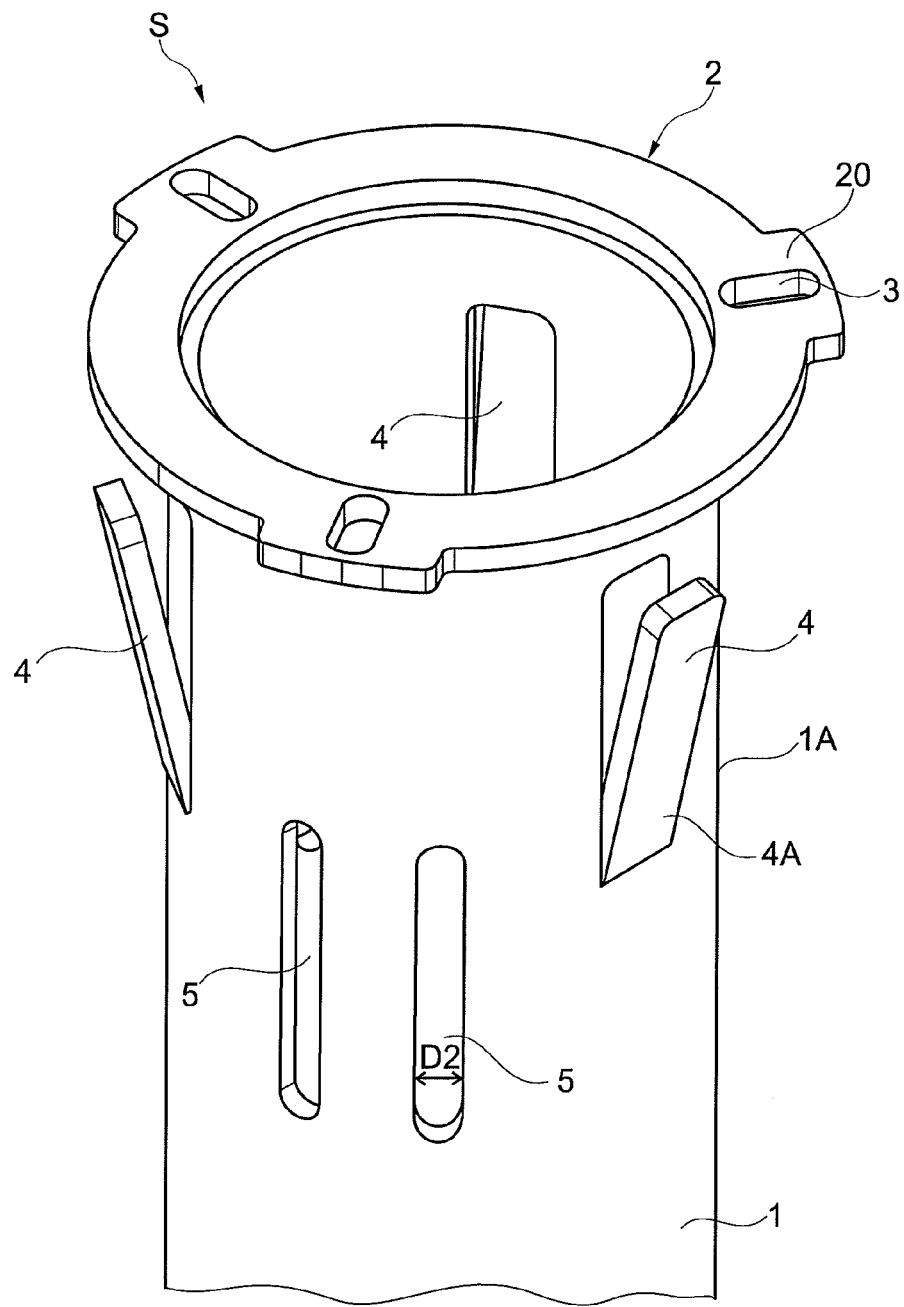
FIG. 3 shows an upper portion of an anti-theft device according to the invention in a perspective view.

FIG. 1 shows a fuel tank 8 in cross-section, wherein the fuel tank comprises a fuel inlet 9/filler neck. The fuel inlet 9 refers to the filling pipe that extends from the tank cap down to the actual tank 8, into which the filler handle is inserted when refilling fuel. Furthermore, the fuel tank 8 comprises a bottom B and fuel 80 up to a second level $N_2$. The fuel inlet 9 of the tank 8 comprises some kind of locking means (not shown) where a tank cap should be mountable to seal the fuel inlet 9. A possible locking means between fuel inlet 9 and tank cap, which is commonly known to the skilled person, could be in the form of grooves on the inside of the fuel inlet 9, and wherein the tank cap comprises protrusions, which should fit into the groove, and thereupon the tank cap is rotated to be locked in place. In a preferred embodiment according to the invention, an anti-theft device S is disposed in the fuel tank/fuel inlet 8, 9.

The anti-theft device S comprises an elongated pipe 1, which preferably extends from the fuel inlet 9 down to the bottom B of the tank. The lower portion 1B of the pipe 1 comprises a closed end, wherein a substance G, preferably a granulate G, is disposed at the bottom of the pipe 1. The substance G can have different sizes and shapes, and can be substantially small objects lying loose in the pipe 1. The substance G preferably has a higher density than the fuel 80, so that the substance G is accumulated at the bottom of the pipe 1. The substance G can, for example, consist of a plastic material, metal, ceramics, gels, stone, etc. In one possible embodiment with a substance G in the form of a granulate G, the granulate G can have a minimum diameter D1 that is greater than a maximum width D2 of openings 5 in the pipe 1, so that the relationship D1>D2 applies. The diameter D1 of the granulate is preferably in the range of 2-10 mm, and more preferably in the range of 4-8 mm. FIG. 3 shows a perspective view of an upper portion 1A of the pipe 1. At the top of the pipe 1, attachment means 4, preferably an annular flange 2 extending in the radial direction of the pipe 1, are disposed. The flange 2 comprises engagement means 20, in the described example 3 pieces of engagement means 20 spaced at 120°. The engagement means 20 are so conceived that, when inserting the pipe 1 into a fuel tank 8, the engagement means 20 should engage the locking means disposed between the fuel inlet 9 and a tank cap, usually in the form of grooves, wherein the tank cap has protrusions which should fit into the groove and then be rotated. Accordingly, it is appreciated that that the engagement means 20 may be different in number and have slightly different designs, as they should be adapted to the fuel inlet 9 in question. In this preferred example, the engagement means 20 are, for example, an extension in the radial direction of the flange 2, and should, when inserted into the tank 8, fit into the grooves in the inner wall (not shown) of the fuel inlet 9, which are part of the locking means for the tank cap. Then the pipe 1 is rotated so that the engagement means 20 are moved into the groove. The engagement means 20 comprise through holes 3 which enable the pipe 1 to be additionally fixed by means of, for example, screws. The pipe 1 has a diameter D in the range of 20-200 mm, more preferably 30-150 mm, and most preferably 50-70 mm.

In the side wall of the pipe 1 below the flange 2, a number of securing means 4, in the described example 3 pieces of securing means 4, are disposed. Said securing means 4 are preferably constituted by resilient tongues 4, wherein the tongues 4 are, at their lower end portion 4A, firmly joined to the pipe 1, to then extend further away from the pipe 1 the closer to the annular flange 2 they get. Preferably, the resilient tongues 4 are an integrated part of the pipe 1 cut out by means of, for example, a water cutting machine. When mounting the anti-theft device S, the pipe 1 is inserted down into the tank 8 and, during the insertion, the tongues 4 are pressed in toward the pipe 1 so that it easily clears the fuel inlet 9 and any other protruding parts. This allows an easy mounting of the anti-theft device S. If someone would try to remove the pipe 1 in order to get access to the fuel 80 in the tank 8 and pulls the pipe 1 upward out of the tank 8 through the fuel inlet 9, the tongues 4 will lock/get stuck against the inner wall of the fuel inlet 9 and/or behind protruding parts in the fuel inlet 9, such as parts of the locking means for the tank cap. Another possible design could be that the tongues 4 are so disposed on the pipe 1 that, when mounted, they end up below the fuel inlet 9, where the fuel inlet 9 discharges into the tank 8, and clamp against the walls of the tank. Preferably, the tongues 4 are so disposed that, after mounting, they are inside the actual fuel inlet 9. The tongues 4 are then positioned in the fuel inlet 9 such that the pipe on the filler handle passes the tongues 4 when the filler handle is inserted into the fuel inlet 9 when refilling fuel. In the event that, after mounting, the tongues 4 should end up below the fuel inlet 9 inside the tank 8, the openings at the tongues 4 should be adapted such that the granulate G does not run the risk of flowing out that way into the tank 8. In that case, the diameter D1 of the granulate G should be greater than the maximum width of the openings at the tongues 4.

Openings 5 are disposed below the tongues 4, in the upper portion 1A of the pipe, preferably in the form of narrow slits, but also other alternatives are possible, such as round through holes. When the anti-theft device S according to the invention is to be utilized in used tanks 8, the bottom end 6 of the pipe preferably comprises some kind of stabilizing means/attachment means 7. One example of a stabilizing means/attachment means 7 is shown in FIG. 2, where the stabilizing means/attachment means 7 is constituted by a rubber bushing 7, which is disposed at the bottom end 6 of the pipe, for example fixed by screws. The rubber bushing 7 extends across the bottom end 6 of the pipe. When the fuel protector S has been mounted in the tank 8, the rubber bushing 7 abuts against the bottom B of the tank and protects against chafing between the pipe 1 and the bottom B of the tank. It is also possible that the stabilizing means/attachment means 7 comprises some kind of magnet causing the pipe 1 to be held in place against the bottom B of the tank.

When the anti-theft device S according to the invention is to be used on newly manufactured tanks 8, the lower portion 1B of the pipe preferably comprises threads 12 on its outside, which are intended to cooperate with a threaded flange 13 disposed at the bottom B of the tank, preferably directly below the fuel inlet 9. When moving the pipe 1 into place, the pipe 1 is fixed by screwing to the threaded flange 13 and is steadily positioned in the tank 8. Another possible design of a pipe 1 according to the invention could be a pipe with a telescopic action. In that case, two different sizes of pipe are used and the smaller pipe is slid into the larger one, and, by means of a telescopic action enabling the two pipes to be extended, the advantage is obtained that the length of the pipe can easily be adapted to reach down to the bottom of the tank. Thus, the same telescopic pipe can be used for different models of tanks.

When the anti-theft device S is mounted in a fuel tank 8 and refilling of fuel 80 is being done, the fuel pump nozzle is inserted into the fuel inlet 9 and fuel 80 flows into the pipe 1. When the fuel level in the pipe 1 reaches a first level N1 flush with the openings 5, the fuel 80 flows further out into the tank 8 through said openings 5. When the fuel 80 in the tank 8 is subsequently used, the fuel level drops to a second level N2 which is located below the first level N1. The first level N1 always maintains its level, irrespective of the second level N2 in the tank, which means that if someone tries to peek in through the fuel inlet 9, the tank 8 appears to be well filled, since it is the first level N1 that is visible. In the event of an attempt to steal the fuel 80, a hose or the like is inserted through the fuel inlet 9 and down into the pipe 1. Since the pipe 1 according to the invention preferably extends all the way to the bottom B of the tank, there is no feeling of an obstacle being present when inserting the hose and the theft attempt will go on. When the fuel 80 starts to be pumped out of the tank 8, the granulate G disposed at the bottom of the pipe 1 is carried into the hose and further into the pump, where the granulate G efficiently ruins the pump. When the granulate G is carried into the pump, the granulate G gets stuck between the moving parts of the pump (a gear pump or the like) and forms a clog. Wedging of the granulate G between gear teeth or the like puts an efficient, abrupt stop to the fuel theft. The granulate G has a size that is greater than the maximum width of the openings 5 in the pipe 1 so that the granulate does not run the risk of flowing out into the tank 8. The granulate G has a minimum diameter D1 that is greater than a maximum width D2 of the openings 5 in the pipe 1, so that the relationship D1>D2 applies, so that the granulate G does not leak out into the fuel tank 8, where it could pass on into the vehicle associated with the fuel tank and pose the risk of damaging the vehicle. It is appreciated that the granulate G should not be too small, since this means that the openings 5 in the pipe 1 have to be made corresponding to the size of the granules, which could mean that the flow of fuel through the openings 5 into the tank cannot keep a good velocity, but runs the risk of overflowing, alternatively of tripping the level control in the filler handle. The granulate G should not be too large either, since in that case, there is a risk that the granulate G cannot be carried with the fuel into the pipe/hose utilized during the theft attempt and further into the pump. A preferred diameter D1 of the granulate is therefore 2-10 mm, more preferably 3-8 mm.

It has happened that fuel thieves have noticed/suspected that some kind of pipe 1 is disposed in the fuel inlet 9 to prevent access to too much fuel 80. In such cases, it has happened that something sharp has been inserted into the pipe 1, and a hole has been punched in the bottom of the pipe, alternatively that brute force has been used to force the pipe down into the tank. It has also happened that a drill has been used to drill holes in the bottom of the pipe to thereby get access to all fuel in the tank 8. Thanks to the fact that the pipe 1 according to invention runs all the way down to the bottom B of the tank, the possibility of getting access to the fuel 80 in the tank 8 via the bottom of the pipe or of forcing the pipe down into the tank by brute force is prevented. If an anti-theft device according to the invention where the pipe 1 does not run to the bottom B of the tank were to be used, it is still possible to prevent someone from drilling through the bottom of the pipe. In FIG. 4, it is seen how the lower portion 1B of the pipe 1 is indented and forms a stop means 10. A loose plate 11, preferably of metal, is disposed below the stop means 10 at the bottom of the pipe, wherein said plate cannot be removed due to the stop means 10 and efficiently prevents a drill from drilling through the bottom of the pipe, since a drill could not penetrate through the plate 11, due to the fact that the plate just rotates when attempting to drill through it.

The invention is not limited by what has been described hereinabove, but can be varied within the scope of the following claims. For instance, it is appreciated that the substance could be something else than only granulate, for example a tangled material (long threads/strands of some material, such as polishing cotton waste and steel wool) could be lying at the bottom of the pipe, and when the fuel is pumped up from the pipe, the tangled material is carried along and into the pump, where it gets entangled with the parts of the pump and puts an efficient stop to the pumping. Another alternative substance could be sand/gravel, alternatively a viscous gel, clogging the parts of the pump and thereby causing it to stop. It is appreciated, for example, that the anti-theft device S can be utilized in all kinds of fuel tanks, such as fuel tanks for construction machines, Färmar tanks, and fuel tanks in passenger cars, trucks, leisure boats, forestry machines, mobile crushing machines, airplane fuel tanks and ship fuel tanks. When the anti-theft device S according to the invention is utilized, for example, in passenger cars, said pipe 1 preferably comprises a stainless, bendable flex pipe, so that it easily can be slid into the tank through the fuel inlet. It should also be understood that the described pipe can have different shapes, such as circular, oval or rectangular. It is also possible that the pipe comprises marking dye, which means that the thieves get marking dye on their hands during the theft attempt, which dye stays for many days and can be helpful when identifying a potential fuel thief. It is also possible to dispose the pipe in the fuel inlet in another way than described above, for instance, the pipe could be welded, screwed, riveted, alternatively use balls securing the pipe in the fuel inlet. Instead of resilient tongues, the securing means could consist of some other possible resilient means extending outwardly from the pipe and touching the diameter of the fuel inlet/filler neck so as to form a locking engagement, for example spring-loaded balls, which, when mounting the pipe in the fuel inlet, are pressed into the pipe, and which, when in position, spring out and abut against the walls of the fuel inlet and provides an obstacle if someone tries to pull the pipe out of the tank. It also possible that the openings are placed lower down on the pipe than on the upper portion as described here, although it is preferred that the openings are placed on the upper portion so that the pipe always appears well filled, even though the actual tank does not contain as much fuel. It is also possible that the tongues are disposed below the fuel inlet/filler neck, and in that embodiment, the openings at the tongues could replace the slits/filling openings, and the fuel would then flow into the tank trough the openings at the tongues instead.

The invention claimed is:

1. An anti-theft device for a fuel tank, comprising:
a pipe securable to a fuel inlet, wherein the pipe comprises a side wall, an attachment at an upper portion, and at least one opening disposed in the side wall of the pipe, wherein the pipe is closed at a lower portion; and
a granulate disposed in the pipe, wherein the granulate is adapted, in the event of a fuel theft attempt, to be carried with fuel into a pump used during the fuel theft attempt and thereby prevent continued pumping,
wherein the granulate is incapable of leaking into the fuel tank, and
wherein the granulate has a minimum diameter D1 that is greater than a maximum diameter D2 of the at least one opening such that D1>D2.

2. The anti-theft device according to claim 1, wherein the pipe comprises a securement disposed at the upper portion of the pipe.

3. The anti-theft device according to claim 2, wherein the securement comprises resilient tongues.

4. The anti-theft device according to claim 1, wherein a loose plate is disposed at a bottom of the pipe.

5. The anti-theft device according to claim 1, wherein a stabilizer is disposed at a bottom end of the pipe.

6. The anti-theft device according to claim 1, wherein the at least one opening comprises elongated apertures located in the upper portion of the pipe.

7. The anti-theft device according to claim 1, wherein the pipe is telescopic.

8. A fuel tank for a vehicle, comprising the anti-theft device according to claim 1.

9. The fuel tank according to claim 8, wherein the pipe extends to a bottom of the fuel tank.

10. The fuel tank according to claim 9, wherein the pipe comprises threads, at the lower portion, adapted to cooperate with threads disposed at the bottom of the fuel tank.

11. The anti-theft device according to claim 1, wherein the fuel tank comprises a lock at the fuel tank inlet, wherein a tank cap is adapted to seal the fuel inlet, and wherein the lock is adapted to engage the attachment of the anti-theft device for securing the anti-theft device to the fuel inlet.

* * * * *